J. D. COMSTOCK.
Ditching-Machine.
No. 221,910. Patented Nov. 25, 1879.
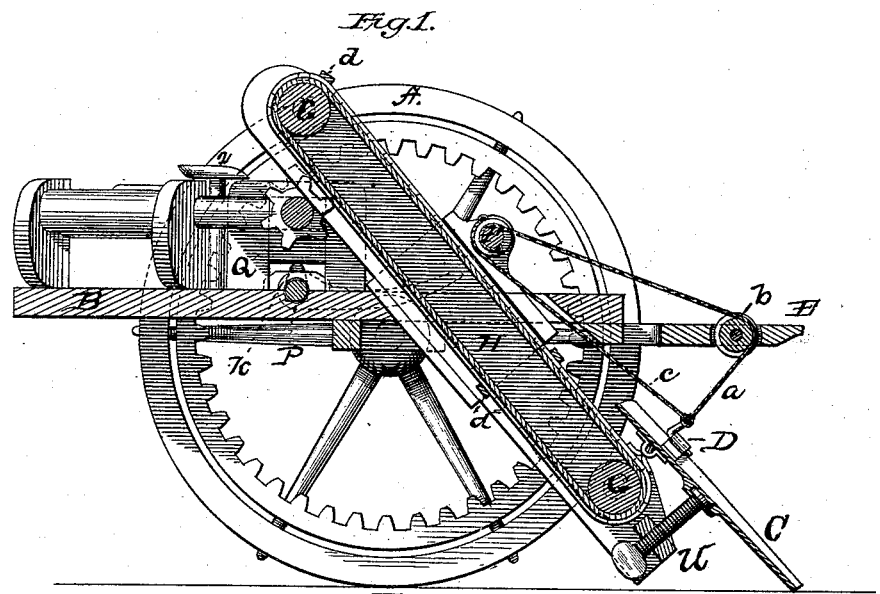
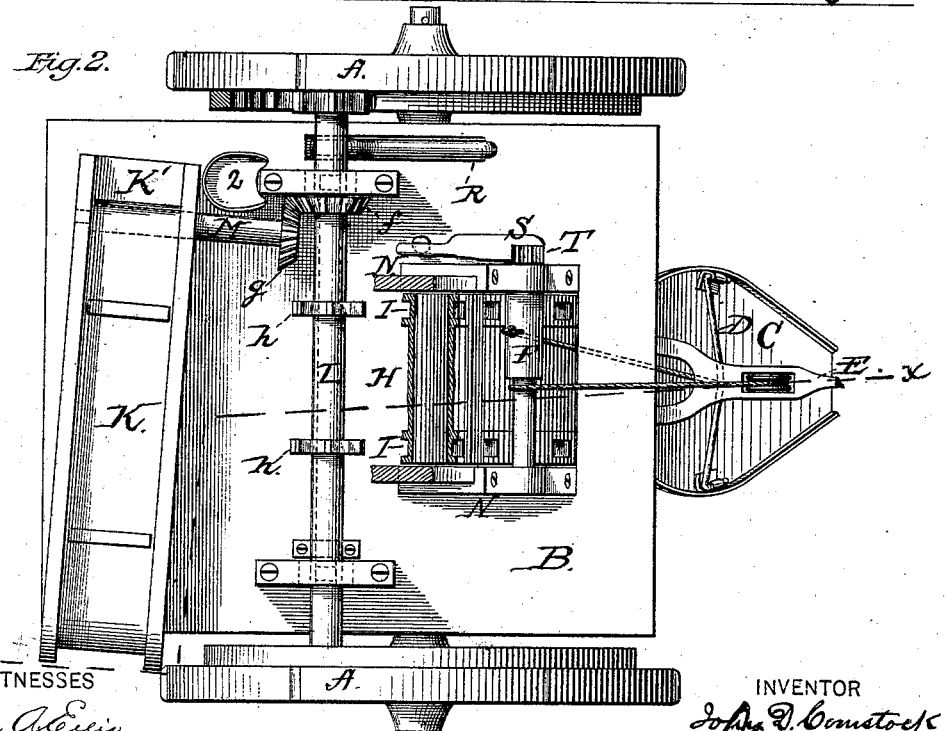
WITNESSES
INVENTOR
ATTORNEY

UNITED STATES PATENT OFFICE.

JOHN D. COMSTOCK, OF COLUMBUS GROVE, OHIO.

IMPROVEMENT IN DITCHING-MACHINES.

Specification forming part of Letters Patent No. 221,910, dated November 25, 1879; application filed February 4, 1879.

*To all whom it may concern:*

Be it known that I, J. D. COMSTOCK, of Columbus Grove, in the county of Putnam and State of Ohio, have invented certain new and useful Improvements in Ditching-Machines; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to certain improvements in ditching-machines, as will be hereinafter more fully set forth and specifically claimed.

In the annexed drawings, forming a part of this specification, Figure 1 is a longitudinal sectional view taken through the line $x\ x$ of Fig. 2. Fig. 2 is a plan view, showing a part of the elevator broken away.

The same letters are employed in all the figures in the indication of identical parts.

The machine is carried upon two wheels, A A, the axle of which is connected to the main frame B.

C is the scoop, of the construction and shape substantially as shown, for cutting the ditch, and is journaled to the lower forward end of the elevator-frame. This scoop is provided with a bail, D, for suspending and adjusting it by means of a chain or rope, $a$, passed over a pulley located in the tongue E, to the windlass F, mounted upon the upper surface of the frame B. Another chain, $c$, passes from the bail D to the enlarged portion of the windlass (see Fig. 1) for raising the scoop and elevating-frame. The scoop attached to the lower forward end of the elevator-frame forms the sides of the trough, and serves as an elevator for the earth detached by the action of cutting.

H is an elevator-frame, arranged in an inclined position, and passes through an opening at the forward end (see Fig. 1) of the frame B. This elevator-frame is provided at each end with a roller, G, over which passes an endless belt having a number of slots, $d$.

The elevating-apron is composed of one or more parts—that is to say, the apron part is provided on each side with endless chains I, which engage with pinions on a shaft below, running at right angles thereto.

The earth raised by the elevator is thrown at its rear end upon a transverse carrier, K, and discharged on the side of the ditch. This carrier passes around rollers similar to the rollers of the elevating-apron, and which have their bearings in a frame, K′, attached to the frame, having the desired inclination for assisting in the delivery of the dirt which it receives from the elevating-apron.

Attached to the inner side of the drive-wheels A are two gear-wheels, engaging with pinions on the end of a transverse shaft, L, supported in journal-boxes upon the upper surface of the frame B. Near one end of this shaft L is arranged a bevel-gear, $f$, which engages with a similar gear, $g$, arranged on the end of the shaft M, which operates the carrier K. Intermediately on the shaft L are arranged two pinions, $h\ h$, to engage with the chain portions of the elevating-apron.

The frame B is provided at the ends of the opening through which the elevator passes with guideways N. Embedded in the frame is a bar, P, having upward projections $k$, only one of which is shown in Fig. 1, which come in contact with the lower half of the bearing-box in the journal-box Q. The end of the shaft P, in front of the driver's seat 2, is provided with a lever, R, which rests in a recess made in the frame B. By operating and pulling the lever R toward the driver, or backward, the lower half of the box is allowed to drop, and the shaft L follows, thereby throwing the machine out of gear.

When it is desired to throw the machine into gear the lever R is thrown forward and lodges in its recess.

The letter S represents a lever attached to the ends of the windlass F, and this lever is provided with a double pawl, which engages with the pinion T. The object of this lever and its double pawl is to raise and lower the elevator to suit shallow or deep ditching.

U represents an adjusting-screw, supplied at its upper end with a button, which fits into a recess made in the under side of the scoop, and at its lower end has a thumb-nut for operating it. By adjusting this screw U the scoop is raised or lowered at its forward end, in order that it may be adapted to the depth which it is desired to cut the ditch, and at the same time throw the rearward end in closer contact with the elevating-apron.

The elevating-apron H herein described is composed of three parts—the intermediate apron and the endless chains I. This elevator can be composed of two parts only—the apron and one endless chain engaging with a single pinion on the shaft L.

The top chain or cord, $a$, which passes over the pulley in the tongue, is the draft-chain, and the under cord or chain, $c$, attached to the larger portion of the windlass F, is for elevating the frame carrying the scoop, and permits the lowering thereof. In the act of lowering, the chain or cord $c$, as the frame descends, unwinds from the larger portion of the windlass at a fast rate while the cord or chain $a$ is wound upon the smaller end of the windlass. The elevation of the frame is accomplished by rewinding the chain $c$ upon the larger portion of the windlass after the tension of chain $a$ has been released, and the latter is unwound from the smaller end of the windlass as the chain $c$ is wound upon the larger end.

Operation: As the machine is drawn forward the scoop cuts the earth, the dirt ascends the scoop to the elevator and falls upon the apron, then is carried upward by means of the positive motion given through the pinions $h\ h$, and dropped at the upper end of the elevator on the carrier K, which runs at right angles thereto. This carrier K receives a positive motion through the beveled gearing $f\ g$ and shaft M, and the dirt upon this carrier is deposited on one side of the machine.

What I claim as my invention is—

1. The scoop C, constructed substantially as shown, journaled to the lower forward end of the elevator-frame, in combination with the adjusting-screw U, having its upper end fitted in a recess on the under side of the said scoop, for the purpose set forth.

2. The combination, with the elevating-frame and its elevating-apron, of the journaled scoop C and the adjusting-screw U, connected together, for the purpose set forth.

3. In combination with the elevating device and journal-boxes Q, axle L, with pinions $h$, the bar P, having an operating-lever, R, and provided at its ends with upward projections $k$, for the purpose set forth.

4. The combination, with a frame having two inclined guideways, N, of the elevating-frame H, with a scoop at its lower end, and a double-acting windlass, substantially as and for the purpose set forth.

5. The combination, with an elevating-apron, of the scoop C, provided with bail D, chain or rope $a$, passed over a pulley, $b$, located in the tongue E, and the double-acting windlass F, substantially as set forth.

In testimony that I claim the foregoing as my own I affix my signature in presence of two witnesses.

JOHN D. COMSTOCK.

Witnesses:
SAMUEL STIRLEN,
JOHN D. VEIRS.